US011487263B2

(12) United States Patent
Stagg

(10) Patent No.: US 11,487,263 B2
(45) Date of Patent: Nov. 1, 2022

(54) WIRELESS EMERGENCY STOP SYSTEMS INCLUDING MOBILE DEVICE CONTROLLERS LINKED WITH SAFETY STOP DEVICES

(71) Applicant: Cattron North America, Inc., Warren, OH (US)

(72) Inventor: David Stagg, Flat Rock, NC (US)

(73) Assignee: CATTRON NORTH AMERICA, INC., Warren, OH (US)

( * ) Notice: Subject to any disclaimer, the term of this patent is extended or adjusted under 35 U.S.C. 154(b) by 410 days.

(21) Appl. No.: 16/781,292

(22) Filed: Feb. 4, 2020

(65) Prior Publication Data
US 2021/0232114 A1    Jul. 29, 2021

Related U.S. Application Data

(60) Provisional application No. 62/965,488, filed on Jan. 24, 2020.

(51) Int. Cl.
*G05B 19/042*    (2006.01)
*H04W 4/80*    (2018.01)
(Continued)

(52) U.S. Cl.
CPC .......... *G05B 19/0425* (2013.01); *H04L 61/50* (2022.05); *H04W 4/80* (2018.02);
(Continued)

(58) Field of Classification Search
CPC ...... G05B 19/0425; G05B 2219/24003; G05B 2219/25186; G05B 9/02
See application file for complete search history.

(56) References Cited

U.S. PATENT DOCUMENTS 6,285,860 B1    9/2001    Szarka et al.
7,005,997 B1    2/2006    Wiewiura
(Continued)

FOREIGN PATENT DOCUMENTS

CN    202205338 U    4/2012
DE    102012009896 A1    11/2013
(Continued)

OTHER PUBLICATIONS

European Search Report for European application No. 18172056 which names the same inventor and same applicant/owner but is not related through a priority claim; dated Nov. 14, 2018, 9 pages.
(Continued)

*Primary Examiner* — Lan-Huong Truong
(74) *Attorney, Agent, or Firm* — Harness, Dickey & Pierce, P.L.C.; Anthony Fussner

(57) ABSTRACT

A wireless emergency stop system includes a machine safety device connected to a machine stop circuit for stopping operation of a machine when the machine stop circuit is activated. The machine safety device includes a wireless communication interface. The system also includes a mobile device controller configured to control operation of the machine, and a safety stop device. The safety stop device includes a wireless communication interface for wireless communication with the machine safety device, and an emergency stop switch configured to, when activated, transmit an emergency stop signal to the machine safety device to trigger an emergency stop of the machine. The mobile device controller is configured to link with the safety stop device via short-range wireless communication.

20 Claims, 3 Drawing Sheets

(51) Int. Cl.
  *H04W 76/10* (2018.01)
  *H04L 61/50* (2022.01)
  *H04L 101/622* (2022.01)

(52) U.S. Cl.
  CPC ... *H04W 76/10* (2018.02); *G05B 2219/24003* (2013.01); *G05B 2219/25186* (2013.01); *H04L 2101/622* (2022.05)

(56) References Cited

U.S. PATENT DOCUMENTS

| | | | |
|---|---|---|---|
| 7,272,456 | B2 | 9/2007 | Farchmin et al. |
| 7,876,220 | B2 | 1/2011 | Aldridge |
| 8,005,572 | B2 | 8/2011 | Evans et al. |
| 8,125,313 | B2* | 2/2012 | Griessnig ............ G05B 19/409 340/5.5 |
| 8,290,646 | B2 | 10/2012 | Ecton et al. |
| 8,334,622 | B2 | 12/2012 | Olsson et al. |
| 8,457,828 | B2 | 6/2013 | Self et al. |
| 2005/0023261 | A1 | 2/2005 | Zheng et al. |
| 2005/0218215 | A1 | 10/2005 | Lauden |
| 2006/0097860 | A1* | 5/2006 | Halfmann ............... G05B 9/02 702/182 |
| 2009/0030550 | A1 | 1/2009 | Nagata et al. |
| 2011/0160910 | A1 | 6/2011 | Preisinger et al. |
| 2014/0148940 | A1 | 5/2014 | Susnjara |
| 2015/0032293 | A1* | 1/2015 | O'Neill ............... B60W 50/029 701/2 |
| 2015/0180527 | A1 | 6/2015 | Fathollahi |
| 2015/0351260 | A1 | 12/2015 | Meftah et al. |
| 2016/0124428 | A1 | 5/2016 | Nutaro et al. |
| 2016/0379482 | A1 | 12/2016 | Saito et al. |
| 2017/0031339 | A1 | 2/2017 | Corbeil et al. |
| 2017/0075329 | A1 | 3/2017 | Whittaker |
| 2017/0329307 | A1 | 11/2017 | Castillo-Effen et al. |
| 2018/0141751 | A1 | 5/2018 | Muranaka |
| 2018/0327193 | A1 | 11/2018 | Hamaguchi |
| 2019/0126489 | A1* | 5/2019 | Wada ..................... B25J 19/06 |
| 2019/0149510 | A1* | 5/2019 | Barthel ............ H04L 61/5038 709/245 |
| 2019/0187658 | A1 | 6/2019 | Fischer |
| 2020/0033816 | A1* | 1/2020 | Uemura ................ H02P 29/024 |
| 2020/0139950 | A1* | 5/2020 | James ..................... B60T 8/94 |
| 2021/0302967 | A1* | 9/2021 | Ko ........................... H01Q 3/22 |

FOREIGN PATENT DOCUMENTS

| | | |
|---|---|---|
| EP | 1327922 A1 | 7/2003 |
| EP | 1141795 B1 | 12/2005 |
| EP | 1519272 B1 | 6/2010 |
| EP | 1935110 B1 | 12/2010 |
| EP | 2865935 A1 | 4/2015 |
| EP | 3422121 A1 * 1/2019 ......... G05B 19/0425 |
| GB | 2198614 A | 6/1988 |
| JP | H09258801 A | 10/1997 |
| JP | 2016117104 A | 6/2016 |
| KR | 20110038787 A | 4/2011 |
| WO | WO-2016202666 A1 | 12/2016 |

OTHER PUBLICATIONS

Canadian office action for Canadian application No. 3004857 which names the same inventor and same applicant/owner but is not related through a priority claim; dated Mar. 22, 2019, 6 pages.

PCT International Search Report and Written Opinion for PCT/US2021/014893 which claims priority to the instant application; dated Apr. 29, 2021; 9 pages.

* cited by examiner

WIRELESS EMERGENCY STOP SYSTEMS INCLUDING MOBILE DEVICE CONTROLLERS LINKED WITH SAFETY STOP DEVICES

CROSS-REFERENCE TO RELATED APPLICATION

This application claims the benefit of and priority to U.S. Provisional Application No. 62/965,488 filed Jan. 24, 2020. The entire disclosure of this provisional application is incorporated herein by reference.

FIELD

The present disclosure generally relates to wireless emergency stop systems including mobile device controllers linked with safety stop devices.

BACKGROUND

This section provides background information related to the present disclosure which is not necessarily prior art.

Hardwired emergency stop devices are often used with machine and equipment control, to allow operators to safely bring a machine or process to a stopped state. But these hardwired devices may require wires, cables, etc. that can increase cost and complexity of the machine control, limit movement of the operators during machine control, etc.

DRAWINGS

The drawings described herein are for illustrative purposes only of selected embodiments and not all possible implementations, and are not intended to limit the scope of the present disclosure.

Corresponding reference numerals indicate corresponding (but not necessarily identical) parts throughout the several views of the drawings.

DETAILED DESCRIPTION

Figure 1:
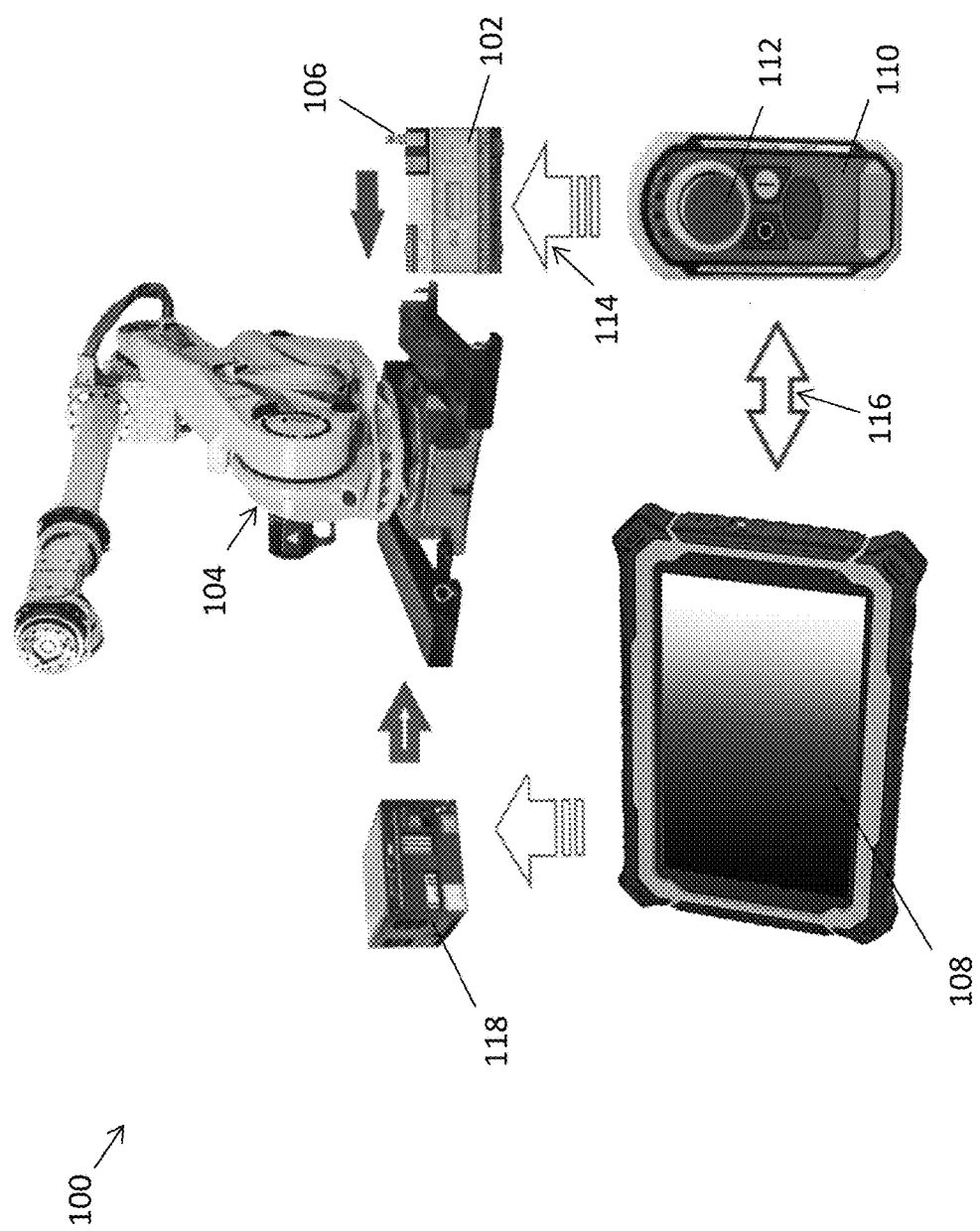
FIG. 1 illustrates a wireless emergency stop system according to an exemplary embodiment of the present disclosure.

Example embodiments will now be described more fully with reference to the accompanying drawings.

Hardwired emergency stop stations are often used in connection for machine and equipment safety, to allow operators to safely bring a machine or process to a safe state. But these hardwired devices may require wires, cables, etc. that can increase cost and complexity of the machine control, limit movement of the operators during machine control, etc.

Mobile device controllers are often used to control machines, but may not have sufficient security to provide reliable emergency stop functionality. In which case, a hardwired panel may be used to provide a wired emergency stop capability, thereby increasing cost and design complexity, limiting operator movement, etc.

Disclosed herein are exemplary embodiments of wireless emergency stop systems including a mobile device controller such as a tablet computer (e.g., APPLE IPAD, other tablets, etc.), etc., that is tethered to a safety stop device, such as via near-field communication (e.g., BLUETOOTH, etc.), etc.

The mobile device controller may detect an identifier of the safety stop device and bind to the safety stop device after determining what machine the safety stop device is controlling (e.g., what machine the safety stop device is in communication with to provide emergency stop functionality, etc.). This may allow the mobile device controller to provide a high safety category stop switch that can be used to control a machine with sufficient security for emergency stop functionality.

In exemplary embodiments, the mobile device controller (e.g., tablet, personal computer (PC), etc.) may include an identity table that cross references the machine identity with an associated wireless E-Stop switch. The machine identity may be fixed or updated, such as by a pairing routine where the E-Stop switch is associated with a machine and that identity could be passed to the tablet, PC, other mobile device controller, etc.

For example, the safety stop device may be a small wireless E-Stop device that uses its own safe communications system to shut down the target machine, where the safety stop device is also tethered to the tablet computer by a BLUETOOTH link. Binding the BLUETOOTH link may trigger the safety stop device to shut down the machine.

The mobile device controller and the safety stop device may be linked, tethered, etc., using any suitable connection protocols. For example, the mobile device controller and safety stop device may verify their connectivity and verify that they are each linked to control the same target machine.

The safety stop device may include any suitable microcontroller architecture, memory, firmware, user interface, wireless interface(s), etc. The safety stop device may be rated for any suitable safety category, such as a Safe Category 3 rating for safety stop devices, etc. The safety stop device may be in wireless communication with the target device via any suitable wireless communication protocol, such as a radio-frequency (RF) link to a machine safety device located at the target machine, etc.

The safety stop device may be linked with the mobile device controller via any suitable linking protocol (e.g., a barcode, RFID reader, or other linking protocol option, etc.). For example, the link may include various link interlocks based on RF signal level, coded messaging, identity verification, etc. The mobile device controller may detect the safety stop device via any suitable identifier of the safety stop device, such as a media access control identifier (MAC ID), a unique ID assigned to the safety stop device, etc.

In some embodiments, binding the mobile device controller to the safety stop device may allow the mobile device controller to control a machine with a specified level of safety (e.g., because the safety stop device can be used to guarantee the ability to stop the machine at a threshold safety rating), without using a hardwired cable that links the mobile device controller to machine power, etc.

As mentioned above, the system may include a safety stop device (e.g., a personal safety devices (PSD) having an emergency stop (E-stop) switch, etc.) and one or more machine safety devices (MSDs) that are connected to (e.g., wired in, etc.) a hardwired emergency stop circuit. The safety stop device may follow a linking protocol with the machine safety device that allows the safety stop device to de-link (e.g., when no longer being used, etc.) without shutting down the machine connected to the machine safety device.

The machine safety device may include a radio interface capable of wireless communication with the safety stop device. The machine safety device implements a high level of safety by maintaining its safety relay(s) closed (e.g., so that a connected machine is allowed to operate normally, etc.) when the following conditions are satisfied or true: (1) when the safety stop device is connected (e.g., linked, etc.) with the machine safety device, (2) when wireless (e.g., radio frequency (RF), etc.) communication with the connected safety stop device is good (e.g., has a sufficient threshold connection quality, etc.), (3) when the safety stop device has a sufficient threshold connection quality with its linked mobile device controller, and (4) when the safety stop device has not activated its emergency stop switch. For example, the machine safety device may only maintain its safety relay(s) closed when the above conditions are true or satisfied.

The machine safety device may open its safety relay(s) (e.g., to stop operation of the connected machine, etc.) when any of the following conditions occur: an internal fault of the machine safety device is detected, the connected safety stop device loses wireless communication with the machine safety device, the connected personal safety device activates its emergency stop switch, the safety stop device loses wireless communication with its linked mobile device controller, a fault of a connected safety stop device is detected, etc.

As mentioned above, each safety stop device may follow a protocol for linking to and de-linking from the machine safety device and/or a mobile device controller without causing a stop of the machine connected to the machine safety device. This protocol may include one or more direct actions from the operator to link or de-link the safety stop device, which are distinctly different from a loss of wireless communication or activation of the emergency stop switch of the personal safety device.

With reference to the figures, FIG. 1 illustrates an exemplary embodiment of a wireless emergency stop system 100 including a machine safety device 102 (e.g., machine control unit (MCU), etc.) wired to a machine stop circuit for stopping operation of a machine 104 when the machine stop circuit is activated. The machine safety device 102 includes a wireless communication interface 106, which may include any suitable antenna configured for wireless communication (e.g., radio frequency (RF) wireless communication, etc.).

The system 100 also includes a mobile device controller 108 configured to control operation of the machine. The system 100 further includes a safety stop device 110 (e.g., a personal E-stop safety device, an operator control unit (OCU), etc.). The safety stop device 110 includes an emergency stop switch 112 and a wireless communication interface for wireless communication with the machine safety device 102 e.g., via the wireless communication interface 106 of the machine safety device 102, etc. The emergency stop switch 112 is configured to, when activated (e.g., by an operator carrying the safety stop device 110, etc.), transmit an emergency stop signal 114 to the machine safety device 102 to trigger an emergency stop of the machine 104.

The emergency stop switch 112 may include any suitable switch, button, key, etc. Therefore, an operator carrying a safety stop device 110 may use the emergency stop switch 112 to quickly trigger an emergency stop of a machine 104 without having to move to the location of the machine safety device 102. In some embodiments, activation of the emergency stop switch 112 may trigger an emergency stop of the machine 104 within less than about 500 milliseconds, etc.

The mobile device controller 108 is configured to link with the safety stop device 110 via short-range wireless communication 116. For example, the mobile device controller 108 may be configured to link with the safety stop device 110 via at least one of a BLUETOOTH short-range wireless communication protocol, an infrared short-range wireless communication protocol, a radio-frequency identification (RFID) short-range wireless communication protocol, etc.

FIG. 1 illustrates an optional program controller 118 connected with the machine 104 to control operation of the machine 104. The mobile device controller 108 may be configured to control operation of the machine 104 by communicating one or more instructions to the program controller 118 (e.g., wirelessly, etc.). Alternatively, or in addition, the mobile device controller 108 may send instructions (e.g., commands, etc.) directly to the machine 104 without any intervening devices. Or, the mobile device controller 108 may send instructions to a device other than the program controller 118 to control the machine 104, etc. The mobile device controller 108 may include any suitable device, such as a tablet computer, a remote control, a handheld unit, other portable mobile device, etc.

The safety stop device 110 may be configured to, in response to disconnection of the short-range wireless communication link 116 with the mobile device controller 108, transmit the emergency stop signal 114 to the machine safety machine safety device 102 to trigger an emergency stop of the machine 104.

As explained further below, the machine safety device 102 may include several protocols for determining when to activate the machine stop circuit to stop operation of the machine 104. And, the safety stop device 110 may follow a linking and de-linking protocol to wirelessly connect to and disconnect from the machine safety device 102 without triggering an emergency stop, to wirelessly connect to and disconnect from the mobile device controller 108 without triggering an emergency stop, etc. This allows an operator(s) to link a mobile device controller 108 as desired (e.g., when working with the machine 104 in communication with the safety stop device 110, etc.), while also allowing the operator(s) to disconnect the mobile device controller 108 from the safety stop device 110 when the operator(s) are finished working with machine 104, when the mobile device controller 108 needs to charge, etc.

In some embodiments, the machine safety device 102 may include one or more safety relays. For example, the machine safety device 102 may include one or more safety relays for activation in response to an emergency stop button activation, and one or more safety relays for activation in response to a loss of wireless communication. Each of the one or more safety relays may be connected to the machine stop circuit. In some embodiments, the relays may include multiple switches (e.g., single contact switches, two-level enable switches, etc.). The relays may be redundant (e.g., redundant E-stop relays and communication loss relays, etc.). For example, two safety relays may be wired in series with an external hard-wired E-stop circuit that allows a machine to run.

The machine safety device 102 may open the relay(s) to stop operation of the machine 104 when an emergency stop is triggered by the safety stop device 110. The machine safety device 102 may maintain the relay(s) in a closed state to allow operation of the machine 104 while the emergency stop is not triggered.

The machine safety device 102 may use any suitable protocol(s) for determining when to allow normal operation of the machine 104 (e.g., by leaving relay(s) of the machine safety device 102 in a closed state, etc.). For example, when the safety stop device 110 is connected with the machine safety device 102, the machine safety device 102 may be configured to maintain normal operation of the machine 104 when the connected safety stop device 110 has wireless communication above a signal quality threshold (e.g., a threshold indicative of sufficient RF signal strength, such as an RSSI threshold value, etc.), and the emergency stop switch 112 is not activated.

The machine safety device 102 may stop operation of the machine 104 (e.g., by opening a relay of the machine safety device 102, etc.) when any one of multiple events occurs: an internal fault of the machine safety device 102 is detected; the safety stop device 110 currently connected with the machine safety device 102 loses wireless communication with the machine safety device 102; the emergency stop switch 112 is activated; the safety stop device 110 currently connected with the machine safety device has a detected fault; the mobile device controller 108 loses wireless communication with the safety stop device 110, etc.

These different conditions may inhibit the machine 104 from operating during unsafe conditions. For example, in addition to stopping operation of the machine 104 when an emergency stop switch 112 is activated, stopping operation of the machine 104 when RF communication is lost, or a fault of a safety stop device 110 or mobile device controller 108 occurs, may provide a precaution to inhibit situations where an operator attempts to activate an emergency stop switch 112 but the safety stop device 110 is unable to properly transmit an emergency stop signal to the machine safety device 102. This may help to address situations that could arise in using the wireless emergency stop system 100 where safety stop device 110 and mobile device controller 108 rely on wireless communication to trigger emergency stop events.

Any suitable RF protocol may be used for communication between the safety stop device 110 and the machine safety device 102. For example, a specific RF frequency band may be selected so that the safety stop device 110 and the machine safety device 102 operate on the same channel. In some embodiments, two RF channels may be used in a frequency diversity mode to increase immunity to RF interference. Each RF frequency band may include a defined number of available RF channels.

The safety stop device 110 may be configured to wirelessly connect to and disconnect from the machine safety device 102 according to a linking protocol that does not trigger an emergency stop of the machine 104, and to wirelessly connect to and disconnect from the mobile device controller 108 according to a linking protocol that does not trigger an emergency stop of the machine 104. For example, the linking protocol may involve the safety stop device 110 receiving an action from an operator (e.g., activating a specific button, etc.) that is distinct from a loss of wireless communication with the machine safety device 102 or mobile device controller 108, and is distinct from activation of the emergency stop switch 112 of the safety stop device 110.

The linking protocol(s) may allow the safety stop device 110 to be connected to and disconnected with the machine safety device 102 as desired, to be linked and de-linked with the mobile device controller 108 as desired, etc., without triggering an emergency stop of the machine 104 each time a safety stop device 110 is de-linked from the machine safety device 102 and/or the mobile device controller 108.

For example, a user may hold down a linking button of the safety stop device 110 and/or the mobile device controller 108 for a period of time (e.g., at least half a second, etc.) when in range of the machine safety device 102 and/or the mobile device controller 108. The linking button is separate from the emergency stop switch 112. If a link is established, the safety stop device 110 may indicate the successful connection via an indicator on the safety stop device 110.

Once a link is established between the safety stop device 110 and the machine safety device 102 and/or the mobile device controller 108, transmission between the devices may be continuous to maintain the safety relays in a closed state. If the machine safety device 102 does not receive a valid telegram, data packet, message, etc., from a linked safety stop device 110 after a period of time, the safety relays may be opened.

Similarly, if the safety stop device 110 does not receive a valid telegram, data packet, message, etc., from a linked mobile device controller 108 after a period of time, the safety stop device 110 may transmit an emergency stop signal 114 to the machine safety device 102. Each message may include an identifier that is unique to the machine 104 in use, and may include a system address to inhibit the machine safety device 102 from acting upon unassigned safety stop devices 110 when an address combination does not match. For example, a system address may be matched with a sub-address of the safety stop device 110, a sub-address of the machine safety device 102, etc.

A user may unlink the safety stop device 110 from the machine safety device 102 and/or the mobile device controller 108 using the linking and unlinking protocol that is separate from triggering an emergency stop. For example, a user may press an unlinking button for a specified amount of time (e.g., at least about three seconds, etc.) to unlink the safety stop device 110. The unlinking button may be the same as or separate from the linking button mentioned above, but should not be the same as the emergency stop switch 112 of the safety stop device 110. An indicator of the safety stop device 110 may indicate when the unlinking process is complete.

The mobile device controller 108 may be configured to link with the safety stop device 110 in response to identifying that the safety stop device 110 is connected with the same machine 104 that the mobile device controller 108 is controlling. For example, the mobile device controller 108 may be configured to identify the safety stop device 110 based on a media access control (MAC) address of the safety stop device 110, a unique identifier assigned to the safety stop device 110, etc. In some embodiments, the mobile device controller 108 may be configured to inhibit control of the machine 104 prior to establishing the link with the safety stop device 110.

Each safety stop device 110 and/or mobile device controller 108 may include a secure protocol for identifying a user, such as a radio frequency identification (RFID) card, a biometric identifier, etc. The user may have pre-defined authorization right(s), which can be stored locally and/or remotely. If the user has appropriate authorization right(s), the safety stop device 110 may be allowed to connect to the machine safety device 102, the mobile device controller 108 may be allowed to connect to the safety stop device 110, etc.

The machine safety device 102, the mobile device controller 108, and the safety stop device 110 may comprise any suitable devices (e.g., computing devices, etc.) which may be configured to perform operations described herein using any suitable combination of software and/or hardware. For example, the machine safety device 102, the mobile device controller 108, and the safety stop device 110 may include any suitable circuitry, logic gates, microprocessor(s), computer-executable instructions stored in memory, etc., operable to cause the machine safety device 102, the mobile device controller 108 and the safety stop device 110 to perform the actions described herein (e.g., triggering an emergency stop, etc.).

Figure 2:
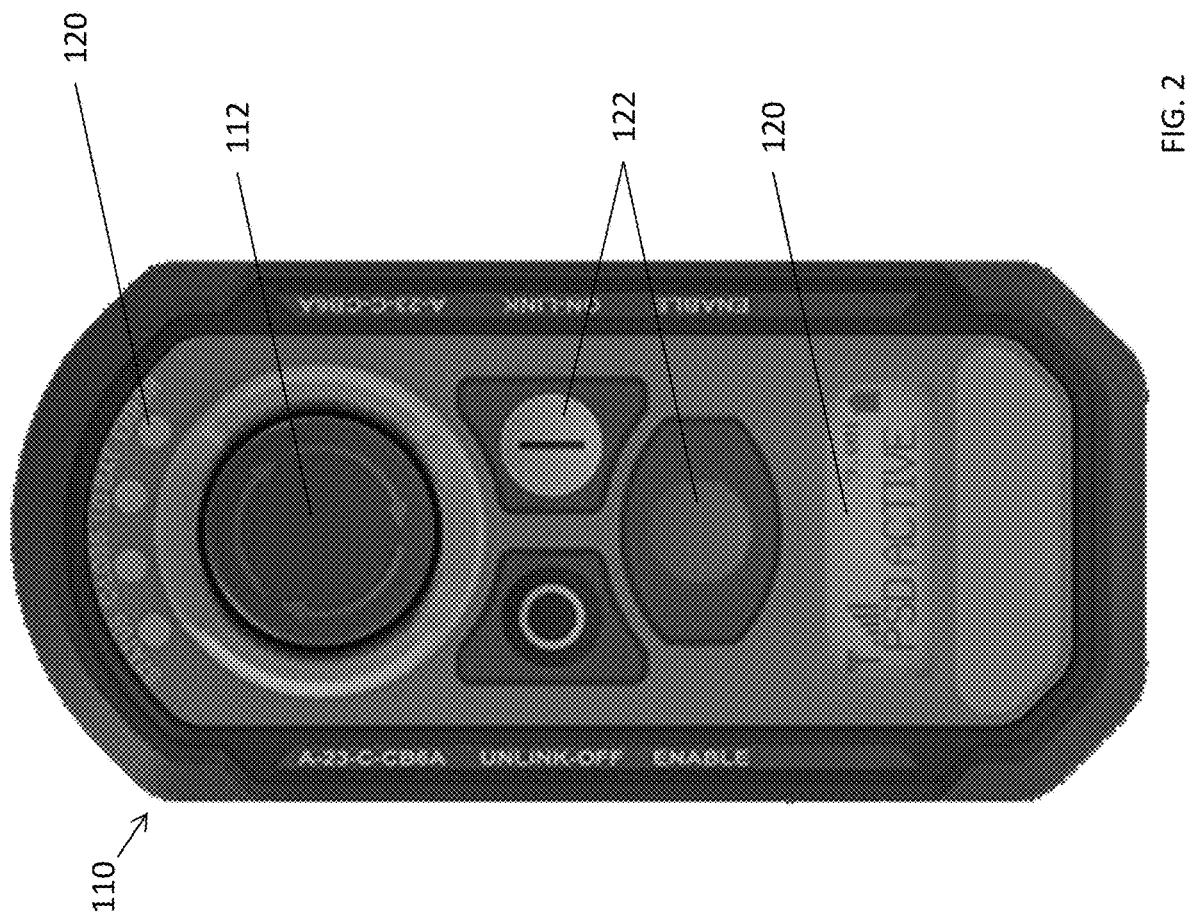
FIG. 2 is a front view of a safety stop device of the wireless emergency stop system shown in FIG. 1.

FIG. 2 illustrates the safety stop device 110 of the wireless emergency stop system 100 shown in FIG. 1. As shown in FIG. 2, the safety stop device 110 includes an emergency stop switch 112. As described above, the emergency stop switch 112 is configured to, when activated, transmit an emergency stop signal to the machine safety device 102 to trigger an emergency stop of the machine 104. The emergency stop switch 112 may be a twist release switch, a pull release switch, a button, etc.

The safety stop device 110 may include indicators 120. The indicators 120 are configured to provide status information to an operator carrying the safety stop device 110. The indicators 120 may include a display (e.g., a liquid crystal display, etc.), one or more light emitting diodes (LEDs), etc.

As also shown in FIG. 2, the safety stop device 110 includes operation inputs 122. For example, the operation inputs 122 can include one or more buttons allowing an operator to access additional functionality of the safety stop device 110, such as linking and de-linking the safety stop device 110 with the machine safety device 102 and/or mobile device controller 108. For example, the safety stop device 110 may be pre-configured for the machine safety device 102 with an address, a sub-address, a channel, etc. The safety stop device 110, the mobile device controller 108, and/or the machine safety device 102 may be configured to operate at any suitable pre-configured frequency (e.g., in the ISM band, at about 433 MHz, at about 450 MHz with 26 channels, at about 869 MHz, at about 915 MHz, at about 2.4 GHz, etc.).

In some embodiments, the safety stop device 110 may function primarily as a wireless E-stop device, such that the safety stop device 110 does not include any control functions for the machine 104. But the safety stop device 110 may still include operation inputs 122 for enabling and disabling the safety stop device 110, turning on and turning off the safety stop device 110, linking and de-linking the safety stop device 110 with the machine safety device 102 and/or the mobile device controller 108, etc.

The safety stop device 110 may include a force sensor and/or a tilt sensor. The force sensor and/or tilt sensor may detect a fall event, etc. of an operator, and transmit the event to the machine safety device 102 and/or the mobile device controller 108. In this case, the machine safety device 102 may trigger an emergency stop of the machine (e.g., because a fallen operator may not be able to correctly supervise the machine 104, may have been injured by the machine 104, etc.).

When the safety stop device 110 is not being used by an operator (e.g., is charging, etc.), the safety stop device 110 may be positioned so that the emergency stop switch 112 is not visible. For example, the emergency stop switch 112 may be faced away from a user, may be housed within a secondary enclosure for battery charging and storage, etc. The secondary enclosure could be locked if desired. The safety stop device 110 may include a rubber bumper for impact resistance, may include an IP67 rated housing for water resistance, etc.

In some embodiments, the safety stop device 110 may include visual and haptic (e.g., vibration, etc.) warning systems for conditions such as low battery, low RF signal, etc. Further, the safety stop device 110 may be configured to alert the user to return to a location with a stronger signal when a connected personal safety device moves towards the edge of its operating range (e.g., about 100 meters from the machine safety device 102 and/or mobile device controller 108, etc.).

Figure 3:
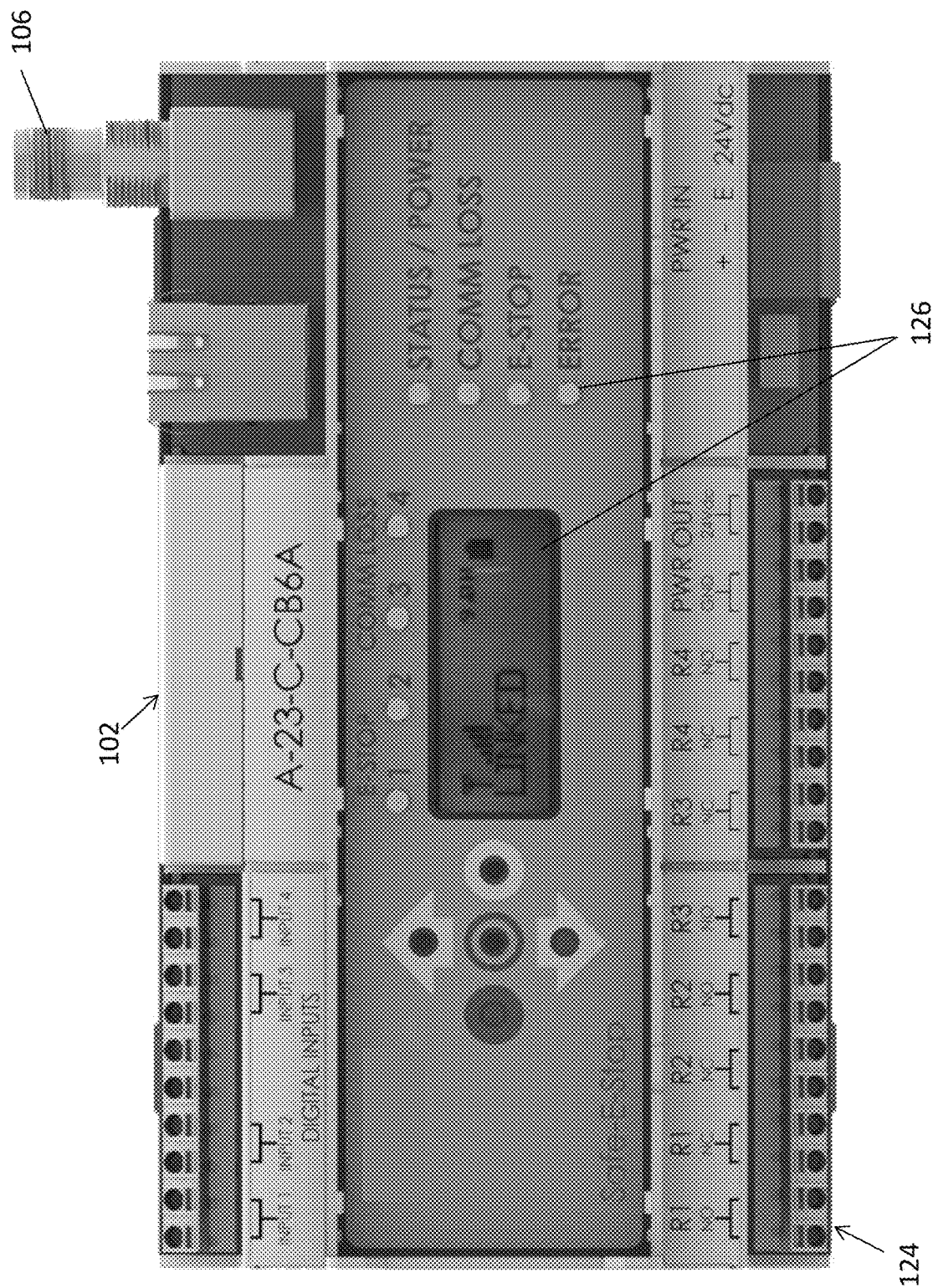
FIG. 3 is a front view of the machine safety device of the wireless emergency stop system shown in FIG. 1.

FIG. 3 illustrates the machine safety device 102 of the emergency stop system 100 shown in FIG. 1. As described above, the machine safety device 102 includes a wireless communication interface 106 for wireless communication with the safety stop device 110. The wireless communication interface 106 illustrated in FIG. 3 is a connector for a wireless antenna, etc.

The machine safety device 102 also includes a machine stop circuit connection 124 for connection to a machine stop circuit (e.g., a hardwired E-Stop output, a safety bus connection, etc.). The machine stop circuit connection 124 may be connected to a main power circuit of the machine 104, a main power reset of the machine 104, a hardwired emergency stop button of the machine 104, a safety programmable logic controller (PLC), etc. For example, the machine safety device 102 may change a status of the safety bus to stop operation of the machine 104, etc.

As shown in FIG. 3, the machine safety device 102 includes indicators 126. The indicators 126 provide status information about the machine safety device 102, safety stop device(s) 110 in wireless communication with the machine safety device 102, etc. The indicators 126 may include a display (e.g., a liquid crystal display, etc.), one or more light emitting diodes (LEDs), etc. For example, the indicators 126 may indicate operational states, errors, under-voltage conditions, relay statuses, Ethernet statuses, received signal strength indicator (RSSI) corresponding to wireless communication with the safety stop device(s) 110, etc.

The machine safety device 102 may comprise a programmable logic controller (PLC) device. The machine safety device 102 may be housed within an enclosure. The machine safety device 102 may be mountable to a DIN rail, may include an Ethernet IP connector, a power supply connector, multiple safety relays (e.g., at least four safety relays, etc.), etc.

According to another example embodiment of the present disclosure, a method of operating a wireless emergency stop system is disclosed. The system includes a machine safety device connected (e.g., wired, etc.) to a machine stop circuit for stopping operation of a machine when the machine stop circuit is activated, a mobile device controller configured to control operation of the machine, and a safety stop device.

The method includes establishing, by the mobile device controller, a short-range wireless communication link with the safety stop device, and wirelessly transmitting, by the mobile device controller, one or more instructions (e.g., multiple control instructions, etc.) to control operation of the machine. The method also includes detecting activation of an emergency stop switch of the safety stop device, and in response to the detected activation, wirelessly transmitting an emergency stop signal to a wireless communication interface of the machine safety device to trigger an emergency stop of the machine.

Establishing the link may include establishing the link with the safety stop device via at least one of a BLUETOOTH short-range wireless communication protocol, an infrared short-range wireless communication protocol, a radio-frequency identification (RFID) short-range wireless communication protocol, etc.

The system may include a program controller (e.g., a safety programmable logic controller (PLC), etc.) connected with the machine to control operation of the machine. And, wirelessly transmitting one or more instructions may include wirelessly transmitting one or more instructions to the program controller to control operation of the machine. The mobile device controller may include any suitable mobile device for controlling operation of the machine, such as a tablet computer, etc.

In response to disconnection of the short-range wireless communication link with the mobile device controller, the method may include transmitting the emergency stop signal to the machine safety machine safety device to trigger an emergency stop of the machine. Establishing the link may include establishing the link with the safety stop device in response to identifying that the safety stop device is connected with the machine that the mobile device controller is controlling. Identifying the safety stop device may include identifying, by the mobile device controller, the safety stop device based on at least one of a media access control (MAC) address of the safety stop device and a unique identifier assigned to the safety stop device.

In some embodiments, the method may include inhibiting control of the machine prior to establishing the link with the safety stop device. The safety stop device may not be connected to the mobile device controller via a wire, cable, etc. Similarly, the safety stop device may not be connected to the machine safety device via a wire, cable, etc.

The method may include, in response to receiving the emergency stop signal at the machine safety device, stopping operation of the machine via the machine stop circuit. For example, stopping operation of the machine may include stopping operation of the machine via the machine stop circuit by opening one or more relays of the machine safety device.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. For example, when permissive phrases, such as "may comprise", "may include", and the like, are used herein, at least one embodiment comprises or includes the feature(s). As used herein, the singular forms "a", "an" and "the" may be intended to include the plural forms as well, unless the context clearly indicates otherwise. The terms "comprises," "comprising," "includes," "including," "has," "have," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally", "about", and "substantially" may be used herein to mean within manufacturing tolerances.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A wireless emergency stop system comprising:
   a machine safety device connected to a machine stop circuit for stopping operation of a machine when the machine stop circuit is activated, the machine safety device including a wireless communication interface;
   a mobile device controller configured to control operation of the machine; and
   a safety stop device including:
      a wireless communication interface for wireless communication with the machine safety device; and
      an emergency stop switch configured to, when activated, transmit an emergency stop signal to the machine safety device to trigger an emergency stop of the machine;
   wherein the mobile device controller is configured to link with the safety stop device via short-range wireless communication;
   wherein the mobile device controller is configured to link with the safety stop device in response to identifying that the safety stop device is connected with the machine that is controllable by the mobile device controller; and
   wherein the mobile device controller is configured to identify the safety stop device based on an identity table that cross references machine identity with an associated safety stop device.

2. The system of claim 1, wherein the mobile device controller is configured to link with the safety stop device via at least one of a BLUETOOTH short-range wireless communication protocol, an infrared short-range wireless communication protocol, and a radio-frequency identification (RFID) short-range wireless communication protocol.

3. The system of claim 1, further comprising a program controller connected with the machine to control operation of the machine, wherein the mobile device controller is configured to control operation of the machine by communicating one or more instructions to the program controller.

4. The system of claim 1, wherein the mobile device controller comprises a tablet computer.

5. The system of claim 1, wherein the safety stop device is configured to, in response to disconnection of the short-range wireless communication link with the mobile device controller, transmit the emergency stop signal to the machine safety device to trigger an emergency stop of the machine.

6. The system of claim 1, wherein the safety stop device is configured to follow a protocol for linking to and de-linking from the machine safety device and/or a mobile device controller without causing a stop of the machine connected to the machine safety device, the protocol including one or more direct actions from an operator to link or de-link the safety stop device, which are distinctly different from a loss of wireless communication or activation of the emergency stop switch of the safety stop device.

7. The system of claim 1, wherein the mobile device controller is configured to identify the safety stop device based on at least one of a media access control (MAC) address of the safety stop device and a unique identifier assigned to the safety stop device.

8. The system of claim 1, wherein the machine identity is fixed or updated by a pairing routine where the safety stop device associated with the machine and the machine identity are passed to the mobile device controller.

9. The system of claim 1, wherein the mobile device controller is configured to inhibit control of the machine prior to establishing the link with the safety stop device.

10. The system of claim 1, wherein the safety stop device is not connected to the mobile device controller via a wire.

11. The system of claim 1, wherein the machine safety device includes one or more safety relays, each of the one or more safety relays connected to the machine stop circuit.

12. The system of claim 11, wherein the machine safety device is configured to open one or more of the safety relays to stop operation of the machine when an emergency stop is triggered by the safety stop device.

13. A method of operating a wireless emergency stop system including a machine safety device connected to a machine stop circuit for stopping operation of a machine when the machine stop circuit is activated, a mobile device controller configured to control operation of the machine, and a safety stop device, the method comprising:
   establishing, by the mobile device controller, a short-range wireless communication link with the safety stop device;
   wirelessly transmitting, by the mobile device controller, one or more instructions to control operation of the machine;
   detecting activation of an emergency stop switch of the safety stop device; and
   in response to the detected activation, wirelessly transmitting an emergency stop signal to a wireless communication interface of the machine safety device to trigger an emergency stop of the machine;
   wherein establishing the link includes establishing the link with the safety stop device in response to identifying that the safet stop device is connected with the machine that the mobile device controller is controlling; and
   wherein identifying the safety stop device includes identifying, by the mobile device controller, the safety stop device based on an identity table that cross references machine identity with an associated safety stop device.

14. The method of claim 13, wherein establishing the link includes establishing the link with the safety stop device via at least one of a BLUETOOTH short-range wireless communication protocol, an infrared short-range wireless communication protocol, and a radio-frequency identification (RFID) short-range wireless communication protocol.

15. The method of claim 13, wherein:
   the system further includes a program controller connected with the machine to control operation of the machine; and
   wirelessly transmitting one or more instructions includes wirelessly transmitting one or more instructions to the program controller to control operation of the machine.

16. The method of claim 13, wherein the mobile device controller comprises a tablet computer.

17. The method of claim 13, further comprising, in response to disconnection of the short-range wireless communication link with the mobile device controller, transmitting the emergency stop signal to the machine safety device to trigger an emergency stop of the machine.

18. The method of claim 13, wherein the machine identity is fixed or updated by a pairing routine where the safety stop device associated with the machine and the machine identity are passed to mobile device controller.

19. The method of claim 13, wherein identifying the safety stop device includes identifying, by the mobile device controller, the safety stop device based on at least one of a media access control (MAC) address of the safety stop device and a unique identifier assigned to the safety stop device.

20. The method of claim 13, further comprising inhibiting control of the machine prior to establishing the link with the safety stop device, and/or wherein the safety stop device is not connected to the mobile device controller via a wire.

* * * * *